United States Patent
Parks

[15] 3,663,896
[45] May 16, 1972

[54] FERROFLUID ULTRASONIC SIGNAL MODULATOR

[72] Inventor: Jack G. Parks, Troy, Mich.
[73] Assignee: The United States of America as represented by the Secretary of the Army
[22] Filed: Aug. 17, 1970
[21] Appl. No.: 64,425

[52] U.S. Cl..............................332/51 M, 324/92, 329/195, 332/29 M, 332/68, 332/26
[51] Int. Cl........................................................H03c 1/08
[58] Field of Search...................332/51, 29 M, 51 M, 26, 68; 324/92, 93, 94; 329/195, 196, 197

[56] References Cited

UNITED STATES PATENTS

| | | | |
|---|---|---|---|
| 2,483,818 | 10/1949 | Evans | 332/29 M |
| 2,557,979 | 6/1951 | Labin | 332/26 X |
| 2,581,780 | 1/1952 | Ahier et al. | 332/26 X |
| 2,792,829 | 5/1957 | Calosi | 332/26 X |
| 2,912,061 | 11/1959 | Kock | 332/26 X |

Primary Examiner—Alfred L. Brody
Attorney—Edward J. Kelly, Herbert Berl and Harry M. Saragovitz

[57] ABSTRACT

A ferrofluid ultrasonic signal modulator consisting of a closed hollow member having a transmitting transducer affixed in one end and a receiving transducer affixed in an opposite end. The closed member forms an interferometer chamber in which are placed two immiscible liquids. One of the liquids is a ferrofluid adjacent the receiving transducer and partially filling the chamber and the other is a liquid possessing low attenuation for the ultrasonic waves, filling the remainder of the chamber and in contact with the transmitting transducer. When a magnetic field is applied to the interface formed by the two liquids the path length through the said other liquid between the transmitting transducer and the interface is changed due to distortions produced in the ferrofluid by the magnetic field. This change shifts the resonance spike position in the frequency domain resulting in amplitude modulation of the ultrasonic signal transmitted through the chamber.

5 Claims, 2 Drawing Figures

Patented May 16, 1972
3,663,896
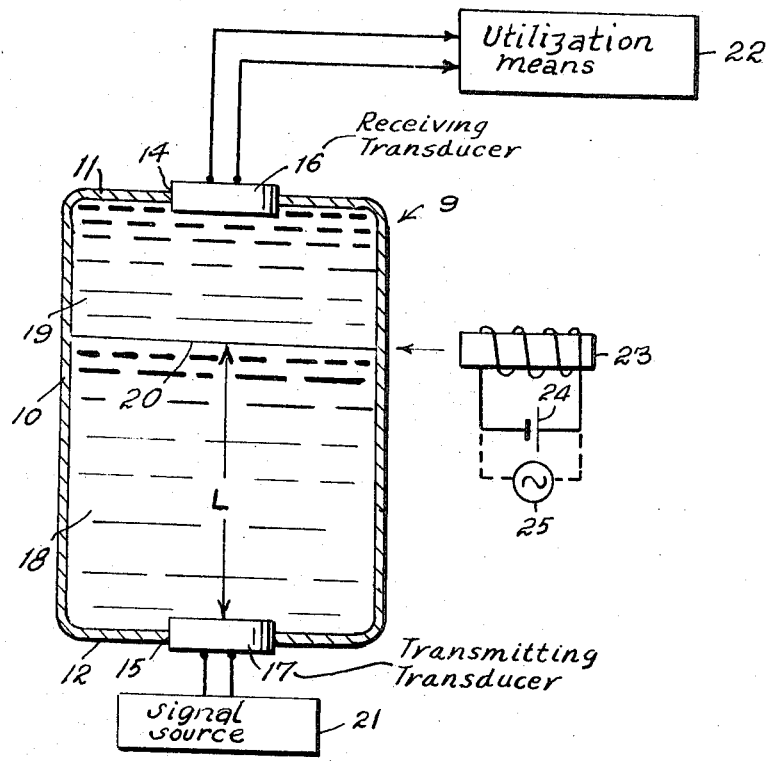
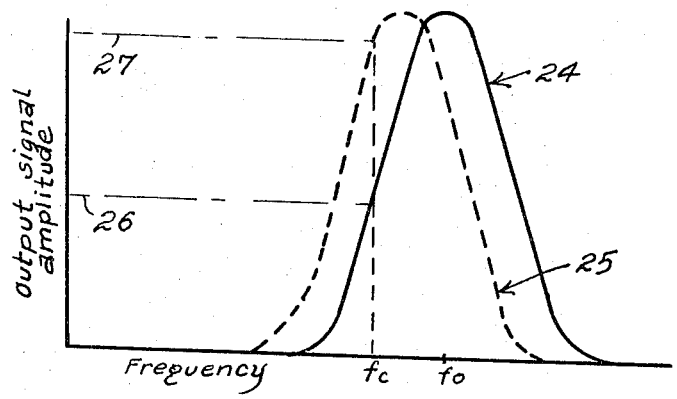
INVENTOR,
Jack G. Parks
BY: Harry M. Saragovitz,
Edward J. Kelly &
Herbert Berl  Attorneys.

FERROFLUID ULTRASONIC SIGNAL MODULATOR

The invention described herein may be manufactured, used, and licensed by or for the Government for governmental purposes without the payment to me of any royalty thereon.

The invention relates to ultrasonic modulators and more particularly to a bifluid ultrasonic modulator for amplitude or phase modulation of ultrasonic signals in the range of, for example, 10kHz to 500MHz.

Prior modulation devices and methods employed to amplitude high frequency signals used plate or grid-bias modulation of class C amplifiers and frequency modulation by controlling an oscillator circuit by means of a reactance vacuum tube. Such devices and methods employed to modulate signals have the disadvantages of limited age, sensitivity to changes in environmental parameters such as gravitation, temperature, radiation and the requirement of extensive electronic circuitry.

The ultrasonic signal modulator of the invention includes an interferometer wherein the chamber thereof are two immiscible liquids. One of the liquids is a ferroliquid and the other is a liquid that offers low attenuation to the wave transmitted therethrough. The application of a magnetic field to the interface of the liquids modifies the shape of the interface and thereby affects a change in the length of interferometer's path between the transmitting transducer and the interface resulting in amplitude modulation of the ultrasonic signal transmitted through the interferometer.

An object of the invention is a new and novel ultrasonic signal modulator that is not sensitive to environmental parameters.

Another object of the invention is a new and novel ultrasonic signal modulator employing a bifluid interferometer wherein the application of a magnetic field to the interface of the fluids results in amplitude modulation of the ultrasonic wave transmitted through the interferometer.

A further object of the invention is a new and novel ferroliquid ultrasonic signal modulator which is not susceptible to deterioration due to age, temperature extremes, radiation fields or vibrations and wherein the modulating agent requires the use of electrical components as opposed to electronic components in prior ultrasonic modulating devices.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawings in which:

FIG. 1 is a schematic cross section of the invention; and
FIG. 2 is a graph showing the output signal amplitude versus the frequency input to the transmitter transducer.

In FIG. 1 there is illustrated a preferred embodiment of the invention wherein the ferrofluid ultrasonic signal transducer is generally indicated by reference numeral 9. 10 is a container, preferable of glass, provided with end closures 11 and 12 formed with perforations 14 and 15 in which are affixed in hermetically sealed relationship receiving transducer 16 and transmitting transducer 17, respectively. Transducers 16 and 17 may be either the piezoelectric or electrostrictive type. The chamber of container 10 contains two immiscible fluids 18 and 19 forming a liquid interface 20. Fluid 18 which is predominant in volume may be any liquid possessing a low attenuation factor for the ultrasonic waves transmitted therethrough and which does not react with the walls of the chamber of liquid 19. Fluid 18 may be, for example, glycerol or silicon fluids or water. Fluid 19 is a ferrofluid which by definition is a fluid which hydromechanically responds to a change in magnetic field intensity. The ferrofluid 19 may consist of an organic carrier such as kerosene having ferrite particles suspended therein plus a dispersing agent which coats the ferrite particles and thereby prevents bunching thereof.

A signal source 21 which may be an electronic variable frequency oscillator is coupled to and excites transmitting transducer 17 whereby ultrasonic waves are transmitted through the interferometer, liquids 18 and 19, to receiving transducer 16 having its output coupled to utilization means 22. A source of magnetic field which serves to distort the liquid interface 20 whereby the path length between the transmitting transducer 17 to the liquid interface 20 is varied may consist of an electromagnet 23 energized by DC source 24 when steady state attenuation of the ultrasonic signal transmitted through the interferometer is desired. When time varying modulation of said signal is desired the DC source 24 may be replaced by an electronic oscillator for generating excitation signals of sine wave or other desired configuration as indicated by reference numeral 25. The ultrasonic sound waves originating at transmitting transducer 17 propagates through liquids 18 and 19 and are received by receiving transducer 16 which converts said waves into electrical signals. Ultrasonic sound waves generated by transmitting transducer 17 in response to electrical signals applied thereto establish standing waves in liquids 18 and 19. Because of the relative abundance of liquid 18, the nodal conditions established in this liquid have a significant effect on the output of receiving transducer 16. This effect is evident when the output signal amplitude is plotted as a function of the frequency of oscillation of the wave generated by transducer 17. A series of peaks or "nodal resonances" emerge as a dominant feature. The frequencies where these resonances occur may be determined by the expression:

$$fo = n(v/2L)$$

where —
$fo$ = the nodal frequency
$n$ = a positive integer
$v$ = the velocity of propagation of sound in liquid 18
$L$ = the distance from transmitting transducer 17 to liquid interface Referring now to FIG. 2: Curve 24 indicates a nodal resonance curve with the distance L unchanged, that is, before application of the magnetic field to liquid interface 20; 25 indicates the displaced nodal resonance curve due to change in distance L resulting from deformation of liquid interface 20 by the magnetic field; line 26 indicates the amplitude of the ultrasonic wave propagated through the interferometer; line 27 indicates the amplitude of said wave due to modulation when the nodal frequency is shifted; fo indicates the nodal frequency; and $fc$ the carrier or signal frequency of said ultrasonic wave.

When transducer 17 is operated at frequency $fc$, FIG. 2, a certain signal amplitude will be produced at the output of transducer 16 which is completely determined by the shape of the associated nodal resonance. The application of a magnetic field, produced when electromagnetic 23 is energized, to liquid interface 20 distorts interface 20 and thereby alters the distance represented by L. This modification of L has the effect of moving the nodal resonance curve along the frequency axis resulting in amplitude modulation of the ultrasonic wave transmitted through the modulator of the invention. Phase angle modulation accompanies the aforementioned amplitude modulation.

While there has been described and illustrated one specific embodiment and application of the invention, it will be clear that variations of the general arrangement and application may be made without departure from the true spirit of the invention. In particular, besides amplitude and/or phase angle modulation of ultrasonic signals the device may be employed as a variable delay line when the magnetic field intensity is held constant and a sinusoidal wave employed. It is a dispersive delay line in that it will delay signals to an amount determined by the frequency of the signal. The role of the device may be reversed by setting the carrier frequency $fc$ constant and noting any change in output signal amplitude as an indication of change in magnetic field intensity, i.e., a magnetometer. Two such devices may be employed in a vibration environment to eliminate seismic noise. In such an arrangement, one device would be shielded from magnetic fields by a mu metal container and the other device, unshielded, would then sense both magnetic and seismic signals. By combining the two signals, the seismic component could be eliminated. The device may also be used to indicate positions parallel to gravitational field lines since the liquid interface surface 20, when slanted, will produce a change in the output signal amplitude. Further, the device has possibilities as a seismometer since vibrations transmitted to the liquid interface 20 register as a variation in output signal amplitude. The magnetic field may be used in this case as a frequency response filter for the seismometer by limiting vibrations to a certain range of frequencies.

I claim:

1. A ferrofluid ultrasonic signal modulator comprising in combination:
   a hermetically sealed housing,
   a first immiscible fluid comprising a ferrofluid in the housing,
   a second immiscible fluid having low attenuation for ultrasonic waves in the housing,
   said first and second immiscible fluids completely filling the chamber of the housing with said second immiscible fluid being in predominance in volume and forming a liquid interface with said first immiscible liquid,
   means for propagating ultrasonic waves through said first and second immiscible liquids affixed in one end of the housing,
   means for receiving the ultrasonic waves propagated through said first and second immiscible liquids affixed in an opposite end of the housing, and
   means for distorting the liquid interface whereby the distance between the liquid interface and the means for propagating ultrasonic waves is varied altering the nodal resonance position in the frequency domain whereby the amplitude of the ultrasonic wave propagated through the first and second immiscible liquids is modulated.

2. The invention in accordance with claim 1 wherein said means for propagating ultrasonic waves through said first and second immiscible liquids comprises a piezoelectric transducer excited by an electronic variable frequency oscillator.

3. The invention in accordance with claim 2 wherein said means for receiving the ultrasonic waves propagated through said first and second immiscible liquids comprise a piezoelectric transducer for converting said ultrasonic waves to electrical signals.

4. The invention in accordance with claim 3 wherein said means for distorting the liquid interface comprises an electromagnet excited by a DC source and having it magnetic field oriented in the plane of the liquid interface whereby steady state attenuation of the ultrasonic wave propagated through said immiscible liquids is obtained.

5. The invention in accordance with claim 1 wherein said means for distorting the liquid interface comprises an electromagnet excited by electronic oscillator means and having its magnetic field oriented in the plane of the liquid interface whereby time varying amplitude modulation of the ultrasonic wave propagated through said immiscible liquids is obtained.

* * * * *